(12) United States Patent
Cockerham et al.

(10) Patent No.: US 12,436,749 B2
(45) Date of Patent: Oct. 7, 2025

(54) INFERRING TYPE DEFINITIONS OF USER-DEFINED TYPES OF VARIABLES IN APPLICATION PROGRAM CODE

(71) Applicant: Veracode, Inc., Burlington, MA (US)

(72) Inventors: Beth Cockerham, Melrose, MA (US); Trent Craig George Waddington, Greenslopes (AU)

(73) Assignee: Veracode, Inc., Burlington, MA (US)

( * ) Notice: Subject to any disclaimer, the term of this patent is extended or adjusted under 35 U.S.C. 154(b) by 146 days.

(21) Appl. No.: 18/194,599

(22) Filed: Mar. 31, 2023

(65) Prior Publication Data

US 2024/0329955 A1    Oct. 3, 2024

(51) Int. Cl.
*G06F 8/41* (2018.01)
*G06F 11/3604* (2025.01)

(52) U.S. Cl.
CPC .......... *G06F 8/437* (2013.01); *G06F 11/3612* (2013.01)

(58) Field of Classification Search
CPC .............................. G06F 11/3612; G06F 8/437
See application file for complete search history.

(56) References Cited

U.S. PATENT DOCUMENTS

| | | | |
|---|---|---|---|
| 9,098,624 B1* | 8/2015 | Feuerstein | G06F 11/3624 |
| 2011/0314459 A1* | 12/2011 | Husbands | G06F 8/437 |
| | | | 717/151 |
| 2012/0079465 A1* | 3/2012 | Harvey | G06F 8/437 |
| | | | 717/146 |
| 2021/0132924 A1* | 5/2021 | Kim | G06F 8/53 |

OTHER PUBLICATIONS

Dong et al., "Static Type Analysis for Python" (Year: 2014).*
Chin et al., "Inference of User-Dened Type Qualiers and Qualier Rules" (Year: 2005).*
Harrison et al. "Structure Editors: User-Defined Type Values and Type Inference" (Year: 2000).*
Duggan et al., "Explaining type inference" (Year: 1996).*
Van Der Weijde, "Type inference for PHP", Jan. 11, 2017, Centrum Wiskunde & Informatica, https://homepages.cwi.nl/~jurgenv/theses/RuudVanDerWeijde.pdf, Date of Access Feb. 9, 2023.

* cited by examiner

*Primary Examiner* — Phillip H Nguyen
(74) *Attorney, Agent, or Firm* — Gilliam IP PLLC

(57) ABSTRACT

Type definitions of user-defined types in application program code for which definitions are absent ("unknown types") are inferred. A static analyzer implements two passes of a fixed-point type inference algorithm. Each pass encompasses a plurality of traversals of the application's control flow to build inferred definitions of unknown types until the inferred definitions are maximally built. To build an inferred definition, based on inferring a variable is an unknown type, the static analyzer infers member variables/functions of the unknown type based on contextual information associated with the variable. Type information of unknown types is propagated along control flow paths. After the first pass terminates, unknown types can be assigned known types based on matching of inferred definitions. Inferred definitions of remaining unknown types are incorporated into the application program code. A second pass of type inferencing and data flow analysis are then performed with the inferred definitions incorporated therein.

20 Claims, 7 Drawing Sheets

INFERRING TYPE DEFINITIONS OF USER-DEFINED TYPES OF VARIABLES IN APPLICATION PROGRAM CODE

BACKGROUND

The disclosure generally relates to data processing (e.g., CPC subclass G06F) and to error detection, error correction, or monitoring (e.g., CPC subclass G06F 11/00).

Static analysis is a technique for program code analysis in which analysis of program code is automated (i.e., in contrast to manual code review) without execution of the program code itself. Control flow analysis, by which the control flow of a program is determined, and data flow analysis, by which possible values of variables of the program are determined, are commonly employed static analysis techniques. The control flow of a program is often represented with a control flow graph that depicts potential paths of traversal during execution of a program. Data flow analysis of a program can utilize the control flow graph of the program to determine propagation of possible values of variables.

Programming languages may be statically typed or dynamically typed. In dynamically typed languages, variable types are determined based on their values at runtime (e.g., by an interpreter) rather than being explicitly declared and checked at compile time as in statically typed languages. Examples of statically typed languages include the Java® programming language, C, and C++. Examples of dynamically typed languages include the JavaScript® programming language, PHP, and Python. Type inference refers to automated detection of types of variables and expressions in program code where explicit definitions or declarations of types are not present. Type inference relies on the context of variables and expressions in program code to deduce their type based on their usage. Type inference algorithms may be constraint-based, where constraints are extracted for language constructs identified in program code and the constraints are solved to resolve the language constructs to types.

BRIEF DESCRIPTION OF THE DRAWINGS

Embodiments of the disclosure may be better understood by referencing the accompanying drawings.

DESCRIPTION

Figure 1:
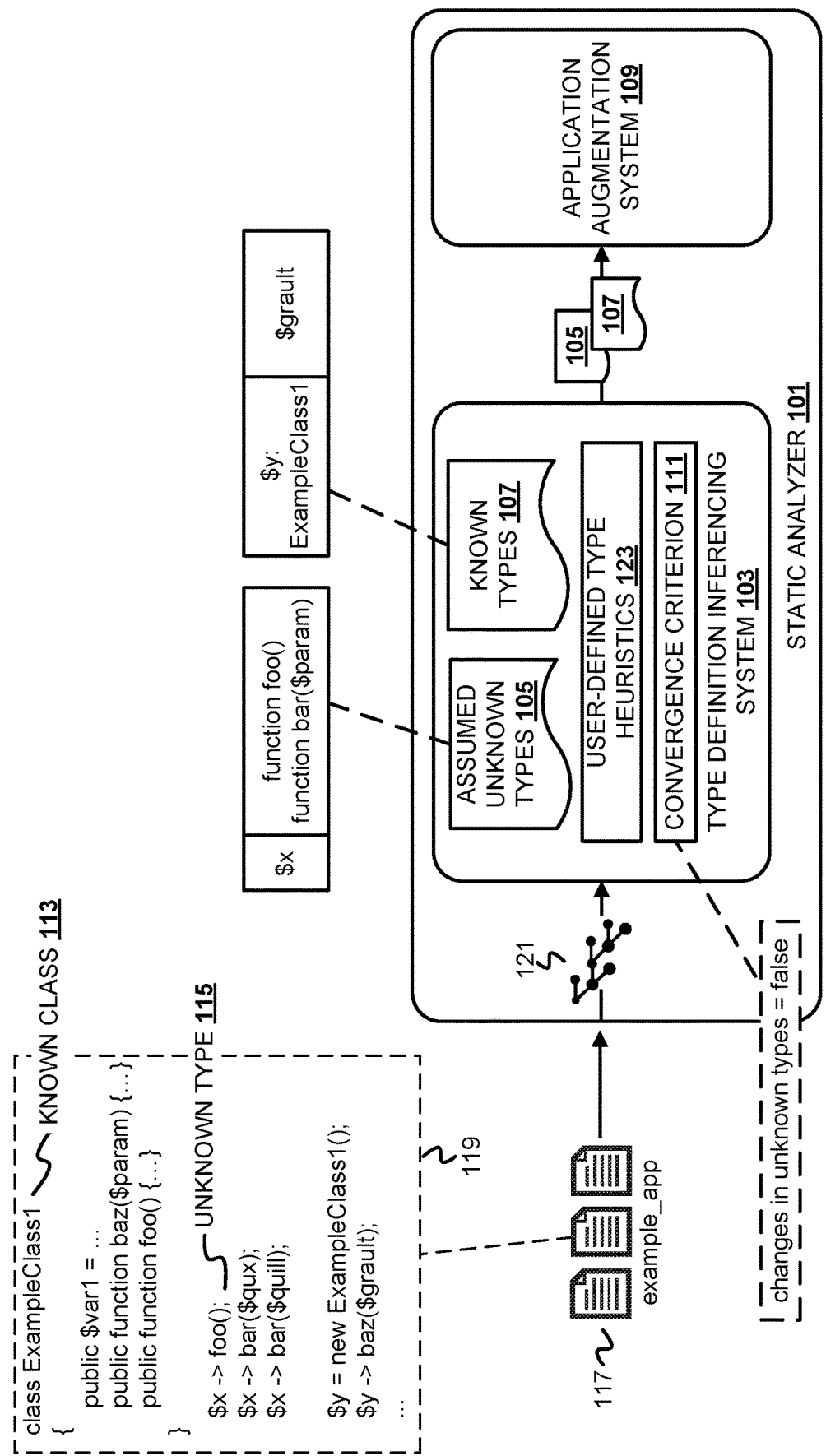
FIG. 1 is a conceptual diagram of inferring definitions of unknown user-defined types identified from program code of an application.

The description that follows includes example systems, methods, techniques, and program flows to aid in understanding the disclosure and not to limit claim scope. However, it is understood that this disclosure may be practiced without these specific details. For instance, this disclosure refers to analysis of applications written in PHP in illustrative examples. Aspects of this disclosure can be also applied to other dynamically typed programming languages (e.g., JavaScript). Well-known instruction instances, protocols, structures, and techniques have not been shown in detail for conciseness.

Terminology

This description uses the phrase "user-defined type" to describe data types defined by users in a program as opposed to built-in data types that are supported by a programming language, such as primitive data types and scalar types. User-defined types can comprise member variables and/or functions/methods. User-defined types may also be referred to as user-defined objects (e.g., JavaScript user-defined objects) or user-defined data types. Examples of user-defined types that are supported by various programming languages include classes and structs.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Application files provided by customers to vendors that employ static analysis for analyzing the customers' applications, such as security vendors, may include program code having varying degrees of completeness. A vendor may, for instance, be provided with incomplete applications submitted for analysis. Incomplete applications as used herein are those where definitions of user-defined types referenced in application program code (e.g., class definitions) are at least partially incomplete in the provided application files. As an example, an application's program code may reference a class that is defined in a PHP driver file that was omitted from the application files submitted for static analysis. Customers' application program code may also include multiple entry points, resulting in regions that are not expected to execute on the same control path. In this case, same-named variables that refer to distinct memory locations and have different types may exist. This may be the case with global variables (e.g., in PHP), such as if variables having different intended types are introduced with the same name in the global scope but in different files corresponding to different entry points. Static analysis of an application that is incomplete or with repeated variable names limits the quality of the static analysis that can be performed. In some cases, the limitations on the static analysis that can be performed may have security implications, as flaws in the application (e.g., vulnerabilities) may ultimately go undetected.

Disclosed herein are techniques for inferring definitions of user-defined types referenced in application program code where the definitions are absent from the application program code (hereinafter simply "unknown types"). A static analyzer implements two passes of a fixed-point type inference algorithm for analysis of the application program code, which may be source code or an intermediate language representation of the source code (e.g., bytecode). A pass of the type inference algorithm encompasses traversing control flow paths of the application until a convergence criterion is satisfied. With the implementation of the two passes of type inferencing disclosed herein, each pass has a different convergence criterion. During the first pass, the static analyzer builds inferred definitions of any unknown types and propagates type information for unknown types along control flow paths. Building an inferred definition of an unknown type refers to inferring the member variables and/or functions of the unknown type based on use of variables having the unknown type as a best type/inferred type in the program code. As the static analyzer encounters variables with known user-defined types, or those having a known definition that can be identified in the application program code (hereinafter simply "known types"), the static analyzer records contextual information about the known type but does not propagate the type information along control flow paths. The type inference algorithm is referred to as a fixed-point algorithm because type inferencing and building of unknown types proceeds until a fixed-point is reached, which for the first pass is defined as a point at which each unknown type is maximally built (i.e., no additional inferred member variables/functions are being added to any unknown types).

After the first pass is complete, the static analyzer determines if the unknown types that were identified from the application program code can be condensed or reduced. Two or more unknown types can be condensed into one unknown type if a first of the unknown types contains the member variables/functions of the other(s). Unknown types that match a known type that was recorded can also be assigned the known type. Once unknown types have been condensed or reduced to the extent possible, the static analyzer incorporates the inferred definitions of the unknown types that remain directly into a representation of the application program code to generate an augmented representation of the application program code. The second pass of type inferencing uses the augmented representation of the application program code and proceeds according to classical type inferencing in which type information for variables with known types is propagated. The result is a more robust static analysis of the application than would otherwise have been possible without augmenting the application through building unknown types to infer the contents of their missing type definitions.

Additionally, after a first pass of type inferencing, whether according to the type inferencing for building inferred definitions of unknown types or according to a standard type inferencing algorithm (e.g., constraint-based type inferencing), the static analyzer can rename global variables that share a name but correspond to different types and thus also correspond to different memory locations. The static analyzer evaluates identified variables and their inferred types from the first pass of type inferencing and, if two global variables having a same name but different types are identified, the global variables can be distinguished via renaming of at least one of the global variables before a second pass of type inferencing and data flow analysis are performed. The renaming of the global variable(s) is incorporated in the program code before the second pass is performed. Renaming a global variable(s) in the case of same-named but differently-typed global variables distinguishes the instances of the global variable to provide for correctly inferring their respective types and propagating values without ambiguity.

Example Illustrations

FIG. 1 is a conceptual diagram of inferring definitions of unknown user-defined types identified from program code of an application. A static analyzer 101 analyzes program code 119 of an application based on application files 117 that it has obtained, which are depicted as being named "example_app." In this example, the application is written in PHP. The application files 117 may comprise source code or an intermediate language representation of the application source code, such as bytecode. FIG. 1 depicts the program code 119 as comprising exemplary PHP source code of the application files 117 for clarity and to aid in understanding. As another example, the static analyzer 101 may import binary code of the application and raise the semantic level of the binary code (e.g., through decompiling the binary code) such that the application files 117 comprise the program code resulting from decompiling, such as bytecode or another intermediate representation. The application files 117 may have been provided by a customer, such as through uploading the application files 117 for static analysis by the static analyzer 101. In other words, the static analyzer 101 and application files 117 can correspond to different entities such that the static analyzer 101 does not have access to all files of the owner of the application files 117. For instance, if a file(s) has been inadvertently omitted from the application files 117 supplied for static analysis by the customer, the owning/managing entity of the static analyzer 101 cannot directly access the missing file(s). As another example, a customer that supplied the application files 117 to the static analyzer 101 may have omitted a file(s) implementing a top-level control or dispatch layer in the application files 117, such as a controller/dispatch layer that comprises a class definition for a singleton class. The static analyzer 101 comprises a type definition inferencing system 103 and an application augmentation system 109. FIG. 1 depicts exemplary functionality of the type definition inferencing system 103 (hereinafter "the system 103"). Exemplary functionality of the application augmentation system 109 is depicted in additional detail in FIG. 2.

User-defined types that embody known and unknown types can vary across implementations and across programming languages. In this example, the user-defined types are PHP classes. This example assumes that one or more files that comprise class definitions have been omitted from the application files 117, such as a top-level driver file(s). With reference to FIG. 1, the exemplary program code of the application files 117 includes a definition of a known class 113 named ExampleClass1, which has a member variable named $var1 and member functions named baz( ) and foo( ), with baz( ) having one parameter $param. The known class 113 is referred to as such because the complete class definition is included in the application files 117. The exemplary program code of the application files 117 also includes calls made by a variable $x to functions named foo( ) and bar( ) (the latter of which has one parameter). The variable $x corresponds to an unknown type 115 because its class definition is absent from the application files 117; in other words, although there is evidence for the existence of a type definition (e.g., a class definition) for a type having member functions named foo( ) and bar( ) in the application files 117, such a type has not been defined in the application files 117 that are available to the static analyzer 101. As illustrated in FIG. 1 for the unknown type 115, initial allocations for unknown types, such as a constructor call that stores a new instance of the unknown type 115 in the variable $x, may be missing from application program code.

The system 103 obtains the application files 117 and begins traversing control flow paths 121 of the application for analysis of the program code 119 and type inferencing of variables identified therein. The static analyzer 101 may have previously generated a control flow graph or other representation of control flow from the program code 119, where the control flow graph or other control flow representation comprises the control flow paths 121, such that the traversal of the control flow paths 121 by the system 103 can include traversal of the control flow graph or other control flow representation. The control flow paths 121 may represent inter-procedural calling relationships. Each complete traversal of the control flow paths 121 through functions identified in the program code 119 is referred to as an iteration. At each iteration, the system 103 identifies variables of the program code 119 (e.g., from a corresponding control flow graph node) and infers corresponding best types based on rules for typing and constraints and/or syntactic elements identified from the program code 119. Best types of variables may also be determined based on types of other variables propagated through the control flow paths 121, such as propagated types of function parameters, return values, etc. The inferred best type, which may comprise indications of one or more member functions and/or member variables inferred to correspond to the variable type, can change between iterations based on constraints on variables identified at each iteration. Type inferencing of standard, non-user defined types (i.e., scalar variables, primitive data types, etc.) can be performed based on known or defined rules for typing based on constraints and/or syntax elements identified from the program code 119 for such types. Typing of user-defined types varies between two passes of type inferencing, where a pass refers to performing a plurality of iterations until a convergence criterion has been satisfied. For the first pass, the system 103 traverses the control flow paths 121 until a convergence criterion 111 has been satisfied. This example depicts an example of type inference of variables with user-defined types by the system 103 during the first pass until satisfaction of the convergence criterion 111.

As the system 103 encounters expressions and statements comprising variables during traversal of the control flow paths 121 (e.g., in respective nodes of a control flow graph), the system 103 may identify variables corresponding to user-defined types. Identification of variables corresponding to user-defined types may be based on keywords identified in the program code 119, such as keywords indicative of a constructor call (e.g., "new" in source code or its corresponding intermediate representation), contextual information identified from program code that is indicative of a user-defined type (e.g., function calls invoked for a variable that are not part of a standard library of the programming language in which the program code 119 is written), and/or other constraints identified from program code. The system 103 can record indications of each variable inferred to have a user-defined type in assumed unknown types ("the unknown types") 105 and known types 107; indications of an unknown type may instead of or also be recorded as property values for the corresponding variable(s). The unknown types 105 and the known types 107 may each comprise a data structure(s) (e.g., a map). The unknown types 105 comprise indications of user-defined types of variables for which a definition is not readily known by the system 103 and corresponding functions and/or variables inferred to belong to an unknown user-defined type, including inferred types of member variables, function parameters, and/or return values. The known types 107 comprise types inferred for variables and/or functions (e.g., types of return values and/or parameters) that the system 103 discerns to be known types, such as user-defined types for which a type definition is readily known to the system 103.

The unknown types 105 are referred to as assumed unknown during the first pass of type inferencing because unknown types are "preferred" to known types during the first pass in that type information of variables with unknown types is propagated (i.e., carried through control flow path traversal) but type information of variables with known types is not propagated past the occurrence of a variable having an unknown type. In other words, if a variable has an unknown type but a known type is identified for the variable, such as a known type identified for an inferred member variable of the unknown type, the known type is recorded but not propagated. As a result, unknown types may be matched to known types after the first pass if the inferred member variables/functions of an unknown type match the known member variables/functions of a known type.

Identified constructor calls, contextual information, and/or the other constraints associated with a variable that the system 103 identifies further inform the system 103 of whether to record type information inferred for the variable to the unknown types 105 or the known types 107; type information inferred for a variable can comprise an indication of the variable type itself (e.g., a type name) and/or inferred types of any associated variables, such as member variables, and return values and/or parameters of functions called by the variable. The system 103 implements heuristics 123 for determining whether user-defined types are known or unknown during the first pass of type inferencing based on information identifiable from the program code. The first instance of a variable having a user-defined type identified from the program code 119 may be a constructor call or initializer in which an instance of the user-defined type is stored in a variable, a statement in which a function is called by the variable, or an assignment of a value (e.g., a value to which an expression evaluates) to the variable. To this effect, the heuristics 123 can comprise a first heuristic that constructor calls/initializers and calls to functions with known prototypes are indicative that the user-defined type of the associated variable is known. For variables with user-defined types satisfying this heuristic, the system 103 thus records type information inferred for the variable to the known types 107. For identifying unknown types, the heuristics 123 may comprise a heuristic indicating that a statement comprising a call by the variable to a function without a known prototype or assignment to the variable of a value of an unknown type or an expression that evaluates to an unknown type are indicative that the user-defined type is unknown. The system 103 thus records indications of variables determined to have user-defined types that satisfy this heuristic recorded to the unknown types 105.

As the system 103 traverses the control flow paths 121 within an iteration and between iterations, the system 103 also infers member variables and/or functions of each of the unknown types based on use of the corresponding variable in the program code 119. Use of the variable refers to additional expressions and/or statements that comprise the variable, such as function calls made for the variable with the unknown type and/or accesses of other variables via the variable with the unknown type. If the system 103 identifies such an expression or statement, the system 103 updates the corresponding entry of the unknown types 105 with the member variables and/or functions inferred therefrom.

With reference to the example depicted in FIG. 1, during an iteration of traversing the control flow paths 121 of the program code 119, the system 103 identifies a call from a variable named $x to a function named foo( ). For instance, the system 103 can visit a node of a control flow graph generated for the program code 119 that comprises the statement "$x→foo( )" (or an intermediate representation thereof). The system 103 determines that the type of $x is user-defined and further determines whether the user-defined type is known. As described above, during the first pass of type inferencing leveraging the heuristics 123, the system 103 may treat calls by variables to functions that are unknown (e.g., functions without an identifiable prototype or functions that are not defined in an included library) as indicative that the corresponding variable's type is an unknown type. Such is the case in this example, so the system 103 determines that the variable $x corresponds to an unknown type and designates that the type of the variable $x is unknown. Designating the type of the variable $x as being unknown by the system 103 can include recording the variable $x in a corresponding entry (e.g., a data structure element) of the unknown types 105 and/or associating a property value with the variable $x that indicates the variable's type is unknown. The system 103 also infers that the function foo( ) is a member function of the unknown type of $x, or the unknown type 115, and can record an indication of the function foo( ) in the entry for $x in the unknown types 105 corresponding to the unknown type being built for $x.

The system 103 continues the traversal of the control flow paths 121 and subsequently identifies (e.g., in a respective node of the control flow graph) a function call made from the variable $x to a function named bar( ) with a function argument comprising a value of a variable $qux. The system 103 infers that the function bar( ) having a single parameter corresponding to $qux is a member function of the unknown type of $x, or the unknown type 115, due to the function being called for $x and $x having a best type that is an unknown type. Identifying functions called with a variable as a base expression can be based on syntax of the programming language or intermediate representation of the program code 119 (e.g., source code or intermediate representation comprising dot notation, arrow notation, etc.). The system 103 records indications of the function bar( ), including an indication of its one parameter $param inferred from the inclusion of $qux in the function call, in the entry of the unknown types 105 corresponding to $x. The unknown type of $x thus now comprises functions foo( ) and bar($param).

As the traversal of the control flow paths 121 continues, the system 103 propagates type information inferred for the variable $x and its inferred member variables and/or functions along the control flow paths 121. Type information that is propagated for a variable of an unknown type can include indications of the inferred member variable(s) and/or function(s) of an unknown type themselves and/or inferred types of the member variable(s), return value(s) of the member function(s), and/or parameter value(s) of the member function(s). An inferred definition of an unknown type can thus be built out more completely as the associated type information is propagated along control flow paths and the system 103 performs subsequent type inferencing. As an example, propagation of types of variables corresponding to the parameter $param along the control flow paths 121 in association with $x can allow for a type of the function parameter $param and potentially any variables referenced in bar( ) (e.g., those corresponding to $param) to be inferred based on usage of variables corresponding to the function parameter $param that the system 103 can identify from the control flow paths 121. To illustrate, assume that the system 103 inferred a type of $qux based on its usage in the program code 119. As the system 103 continues the traversal along the control flow paths 121, it subsequently identifies a second call to bar( ) made by $x with a variable $quill provided as a function argument. The type of $qux will be propagated to the function argument $quill, so $quill will take on this inferred type that was propagated to the second function call to bar( ) by way of the parameter $param based on use of $qux in the program code and inference of its respective type. This also allows for an inferred prototype of the function bar( ) to be built more completely.

The system 103 continues the traversal along the control flow paths 121 and identifies an expression "$y=new ExampleClass1( )" (e.g., in a corresponding control flow graph node). The system 103 determines that the type of the created instance being stored in the variable $y is a user-defined type and further determines whether the user-defined type is a known type based on the heuristics 123. As described above, this example assumes that constructor calls are designated in the heuristics 123 as an indicator that the corresponding variable is a known type, and the system 103 thus infers that the variable $y has a known type corresponding to the known class 113, or ExampleClass1. The system 103 continues traversal of the control flow paths 121 and identifies a call by the variable $y to a function named baz( ) with a variable $grault provided as an argument and records an indication of the type of $grault, which may be inferred based on the prototype of the function baz( ) or based on context of use of $grault in the program code 119, in the known types 107. Because the variable $y is associated with a known type hint, the system 103 does not propagate type information accumulated for the known type of the variable $y (e.g., the type of $grault) along control flow paths. Restricting propagation of type information to the unknown types 105 during the first pass allows the system 103 to collect additional type information about an unknown type that can be inferred from propagation and avoid premature typing of unknown types for which known type hints may also exist. However, recording type information inferred for known types to the known types 107 can inform assignment of known types to unknown types based on matching of type members and the types inferred for function return values, parameters, and/or member variables.

Both known and unknown type hints may exist for a variable. For instance, while not depicted in FIG. 1, the variable $x that the system 103 inferred to have the unknown type 115 may later (i.e., with respect to the control flow path 121 traversal) be assigned a value having a known type. As an example, the system 103 may encounter a constructor call to store an instance of a known class in another variable $z, the type information of which the system 103 records in the known types 107 due to the constructor call being a known type hint. The system 103 may later encounter an assignment expression "$x=$z," which assigns a known type corresponding to $z to $x. While the program code 119 across the application files 117 was missing an initial creation and assignment of the instance of the unknown type 115 to $x, the assignment of $z to $x provides a known type hint for $x. The system 103 records this known type hint, or an indication that the variable $x was seen in an assignment expression evaluating to the known type of $z, to the known types 107 while propagating the type information collected for the unknown type 105 of $x through continued traversal of the control flow paths 121. In other words, the system 103 records but does not propagate the type information recorded to the known types 107 for $x and continues propagating the type information recorded to the unknown types 105 for $x. At the end of the first pass, the system 103 may correlate the type information recorded for $x in the unknown types 105 with a corresponding known type recorded for $z in the known types 107 if the inferred member variables and functions are equivalent, resulting in the type of $x being properly named despite the missing constructor call.

The system 103 performs a plurality of iterations of type inferencing in this manner until a convergence criterion 111 has been satisfied. The convergence criterion 111 indicates a criterion that type inferencing (including building of the unknown types 105) can be considered complete once there are no changes in any of the unknown types 105 during an iteration. To illustrate, with reference to FIG. 1, the convergence criterion 111 are satisfied if the member variables and/or functions inferred for the unknown types of the variables $x and $y do not change during an iteration (i.e., no new member functions/variables are recorded to the unknown types 105 during an iteration). The convergence criterion 111 may be represented as a Boolean, where the system 103 tracks at each iteration whether any of the unknown types 105 have been changed through association of a new function name and/or variable therewith. For instance, the system 103 may maintain a Boolean variable representing whether there have been updates to the unknown types 105 during an iteration that has a default value assigned at the beginning of each iteration indicating that there are no updates (e.g., a value of false, 0, etc.). If the system 103 updates any of the unknown types 105 during an iteration, either through updating an existing unknown type inferred for a variable with additional type information or recording a new unknown type inferred for a variable, the system 103 updates the value of the Boolean variable to indicate that the unknown types 105 have been changed during the iteration. The system 103 can then evaluate the value of the Boolean variable at the end of each iteration based on the convergence criterion 111 to determine whether the convergence criterion 111 is satisfied.

After the convergence criterion 111 has been satisfied, the system 103 terminates the first pass of type inferencing. At this point, the unknown types 105 are considered maximal or as complete as possible with inferred member functions/variables of each respective unknown type. The system 103 makes the unknown types 105 and known types 107 available to the application augmentation system 109 for evaluation and augmentation of the program code 119 with inferred definitions of the unknown types before the second pass of type inferencing. Evaluation of unknown and known types identified from the first pass of type inferencing and augmentation of program code is now described in reference to FIG. 2.

FIG. 1 describes the identification of constructor calls as a heuristic for inferring that a user-defined type of a variable is a known type. Implementations may treat constructor calls as "roots of inference" for types of variables in that constructor calls are concrete evidence of known variable types. The type of a variable identified in an expression comprising a constructor call and any member types associated therewith (e.g., member variables and/or return values/parameters of member functions) can thus be assigned and propagated. Types of variables identified in expressions with constructor calls may be recorded before type inference for building of unknown types by the system 103, such as during creation of an intermediate representation of which the program code 119 is comprised by the static analyzer 101 (e.g., as part of decompiling binary code that may be included in the application files 117). Variables for which a constructor call is not identified during this initial processing of the application files 117 by the static analyzer 101 may be assigned a default or generic type. Thus, as the system 103 begins type inference as described in FIG. 1, unknown types of these variables with default/generic types can be created as evidence of user-defined types is identified and the associated evidence is added to a corresponding unknown type of the variable during traversal of the control flow paths 121. Additionally, types of some variables without associated constructor calls, such as function parameters without declared types, are inferred as type information is propagated along the control flow paths 121 during each pass of type inference by the system 103.

Figure 2:
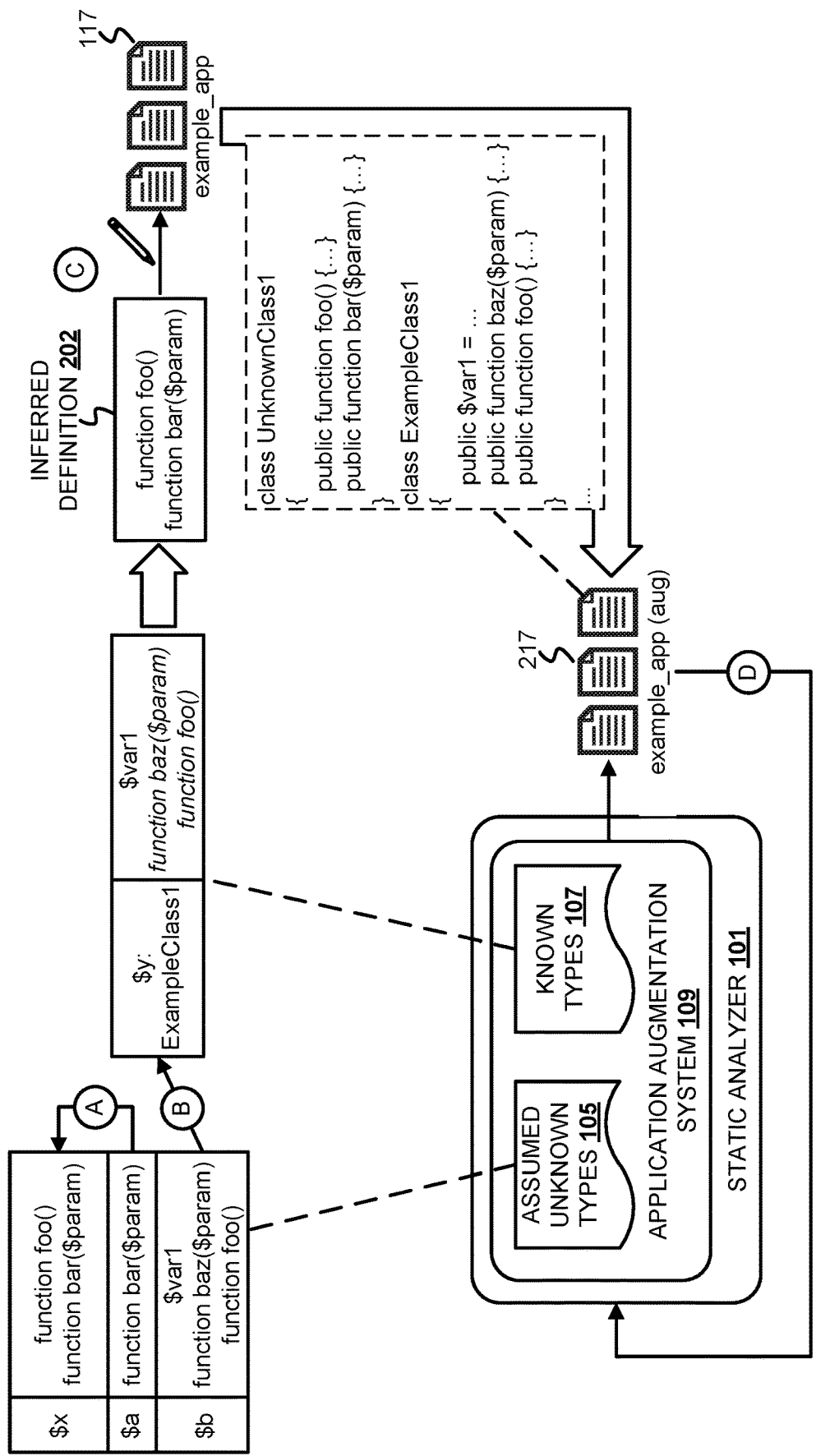
FIG. 2 is a conceptual diagram of augmenting program code of an application based on inferred members of user-defined types identified from the program code.

FIG. 2 is a conceptual diagram of augmenting program code of an application based on inferred members of user-defined types identified from the program code. The application augmentation system 109 (hereinafter "the system 109") has access to the unknown types 105 and known types 107 determined from the first pass of type inferencing, where the unknown types 105 comprise inferred members (i.e., member functions and/or variables) of each unknown type (or assumed unknown type) with which a variable in the program code 119 has been typed. The unknown types 105 in this example are maximally built. FIG. 2 depicts the unknown type of $x built as described in reference to FIG. 1. The unknown types 105 depicted in FIG. 2 also comprise a variable $a that was determined to have an unknown type with an inferred member function named bar( ), which accepts one parameter "param1", and a variable $b that was determined to have an unknown type with inferred member functions named baz( ) and foo( ). The known types 107 comprise an indication of the variable $y and inferred types of the members of the known class ExampleClass1, which is assumed to include an inferred type of the member variable $var1 in this example. For illustrative purposes, FIG. 2 depicts the member functions baz( ) and foo( ) in italics in the entry of the known types 107 corresponding to inferred type information for the known type ExampleClass1 of the variable $y to represent the complete definition of the known class ExampleClass1 that was depicted in FIG. 1, though implementations do not necessarily record complete type definitions to the known types 107.

FIG. 2 is annotated with a series of letters A-D. Each letter represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the system 109 determines if any members of multiple ones of the unknown types 105 can be condensed into one unknown type based on inclusion of members. Two or more unknown types can be condensed to one if the member(s) of an unknown type(s) constitute a subset of the member(s) of another unknown type. The system 109 compares members of each of the unknown types 105 and, in this example, determines that the inferred member of the unknown type of the variable $a (i.e., the member function bar with one argument) constitutes a subset of the inferred members of the unknown type of the variable $x (i.e., the member functions foo( ) and bar( ), with bar accepting one parameter). The system 109 condenses the inferred members of the unknown types corresponding to $x and $a into a single set of inferred members that comprises the functions foo( ) and bar( ). Condensing unknown types can be achieved by associating the variable(s) having a lesser-built unknown type(s) with the maximally built unknown type (e.g., by re-mapping the variable(s) to/associating the variable(s) with the value comprising the maximally built unknown type in the unknown types 105), or the largest set of inferred member functions/variables among unknown types having an inclusion relationship.

At stage B, the system 109 determines if any of the unknown types 105 can be resolved to a known type, which can be based on type definitions that are included in the application files 117. An unknown type can be resolved to a known type if its set of inferred members is equivalent to at least a subset of members of a known type. This may arise if an initial allocation of an instance of a known type (e.g., in a constructor call) and storage of the known type instance in a variable is seen after (i.e., in terms of control flow) a function call by the variable and/or access of a data members(s) via the variable and/or in the case of function arguments and local variables that are assigned values from function arguments. An unknown type may be built for the variable that is later determined to correspond to the known type based on correlation of its inferred member variables/functions with member variables/functions of the corresponding known type. In the example depicted in FIG. 2, the members of the unknown type of the variable $b are constitute at least a subset of the members of the definition of ExampleClass1, and type information inferred for the variable $b and recorded to the unknown types 105 may further match type information of the type members that were recorded in the known types 107 in association with the variable $y (e.g., inferred types of $var1 may match). The unknown type of $b can thus be resolved to the known type ExampleClass1. The system 109 may resolve the entry of the unknown types 105 for the variable $b to reflect the known type ExampleClass1 based on labelling, tagging, or otherwise associating the name of the known type ExampleClass1 with the variable $b.

At stage C, the system 109 incorporates inferred definitions of any remaining unknown types into program code of the application files 117. Once unknown types have been reduced based on identified inclusion relationships among inferred members of unknown types (as with the unknown type of the variables $x and $a) and/or resolution to known types (as with the type of $y and the known class ExampleClass1), inferred definitions of the unknown types that remain can be created and incorporated into the program code 119 of the application. This example assumes that the unknown type of the variables $x and $a comprising inferred member functions foo( ) and bar( ), with the latter having one parameter. While not depicted in FIG. 2 for clarity and to aid in understanding, the system 103 may have also inferred types of the parameter of the function bar( ) and any return values of the functions foo( ) and bar( ) during the first pass of type inferencing and recorded the type(s) in the entry of the unknown types 105 corresponding to the variable $x.

The system 109 incorporates an inferred definition 202 of a class named UnknownClass1 comprising the inferred member variables and functions of the unknown type built for $x and $a into the application files 117 to yield augmented application files 217. The name of the unknown type included in the inferred definition 202, which is UnknownClass1 in this example, may be a unique name assigned by the system 109 for internal use during the second pass of type inferencing by the system 103. For instance, the system 109 may generate a class definition based on the inferred members included in the inferred definition 202, which for the class UnknownClass1 comprises the functions foo( ) and bar( ), that it incorporates in the application files 117. Incorporation of the inferred definition 202 for UnknownClass1 into the application files 117 may be achieved through augmenting a representation or model of the application that the static analyzer 101 generated based on the application files 117 or by writing a class definition comprising the inferred definition in a same programming language and/or program code representation as the program code 119 of the application to the application files 117. Augmenting the application files 117 with the inferred definition 202 allows for a type definition of the corresponding user-defined types to be made available to the analyzing entity (or the static analyzer 101 in this example).

At stage D, the system 109 designates the augmented application files 217 for the second pass of type inferencing by the static analyzer 101. Conventionally, variables corresponding to unknown types can be typed with a single generic or default type. In this case, however, variables that previously were of unknown user-defined types now have inferred definitions included in the augmented application files 217 and can thus be typed according to the maximally built inferred definition of the user-defined type. The second pass of type inferencing can be performed on the augmented application files 217 according to a standard type inferencing algorithm (e.g., a fixed-point, constraint-based type inferencing algorithm) where type information corresponding to known types of variables is now propagated. Known types will be "preferred" during this second pass in the event that a known type is propagated to a variable having an unknown type as its best type (i.e., the best type will change to the known type). The static analyzer 101 can perform further static analysis using the augmented application files 217, such as data flow analysis to determine propagation of values, without substantial loss of information that would arise due to the inclusion of unknown types.

When condensing unknown types as depicted in FIG. 2 at stage A, this example assumes that the function bar( ) with one parameter that was inferred to correspond to the unknown type of $a appears only in the type definition built for the unknown type of $x across both known and unknown types; in other words, FIG. 2 assumes that a function named bar( ) with one parameter is not included in any type definitions other than that inferred for the variable $x. In other examples, however, inferred members of a less-complete unknown type may overlap with inferred members of multiple other more complete types (known or unknown). To illustrate, assume that the inferred members of the unknown type inferred for $a instead include the function foo( ). The inferred members of the unknown types built for both $x and $y also comprise the function foo( ), so the unknown type built for $a cannot simply be folded into a larger set of inferred members with which an inclusion relationship exists. The system 109 thus deterministically condenses the unknown type having the less complete inferred definition into one of the more complete unknown types (condensing the unknown type built for $a into the unknown type built for either $x or $y in this example). For instance, absorption of a less-complete unknown type by one of several unknown types with which an inclusion relationship exists may be informed by on types of return values and/or parameters inferred for the less-complete unknown type. If such types are not available or cannot inform into which unknown type the less-complete unknown type can be condensed, the system 109 may condense the less-complete unknown type into the largest of the unknown types with which an inclusion relationship exists.

Figure 3:
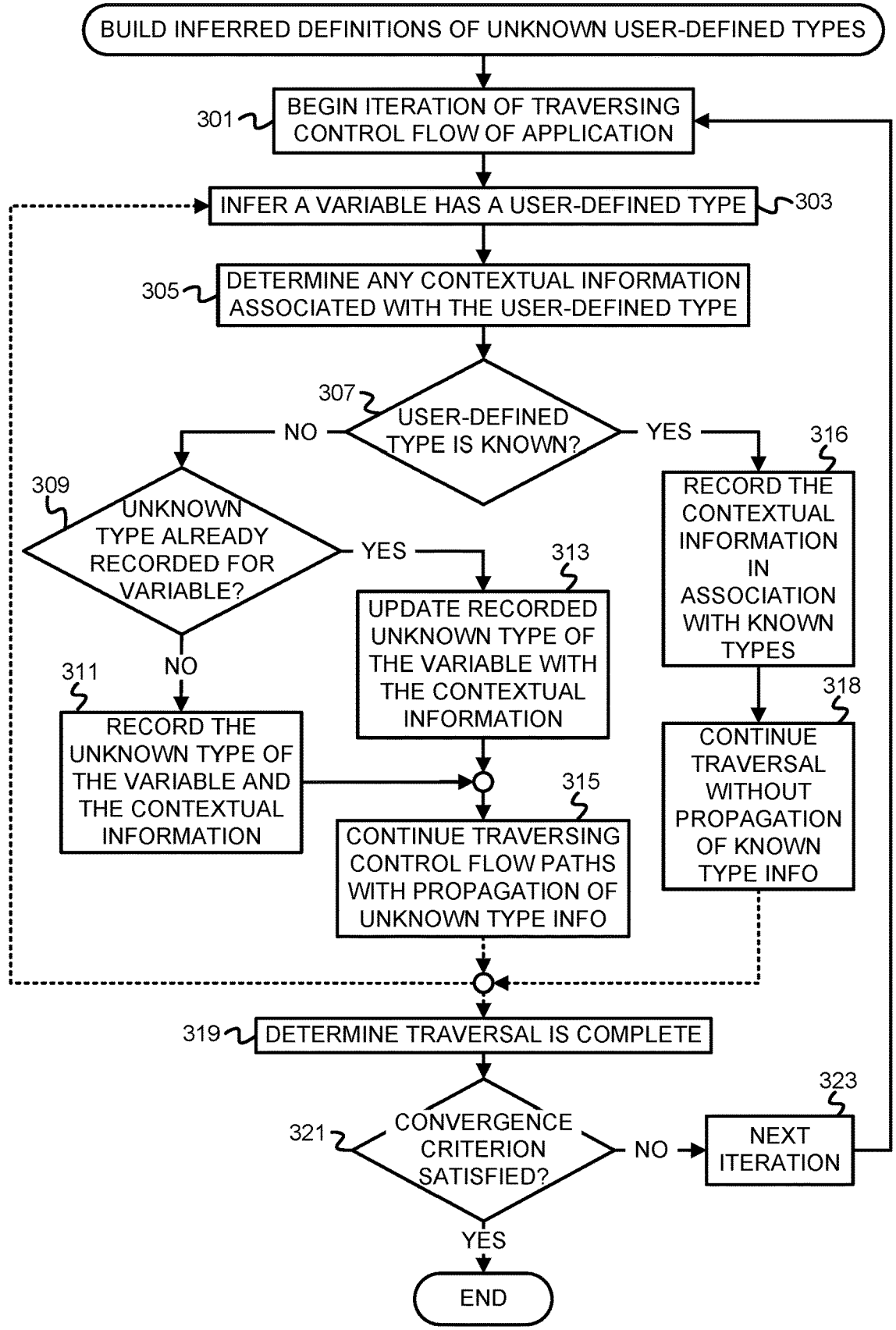
FIG. 3 is a flowchart of example operations for building inferred definitions of unknown user-defined types.
Figure 4:
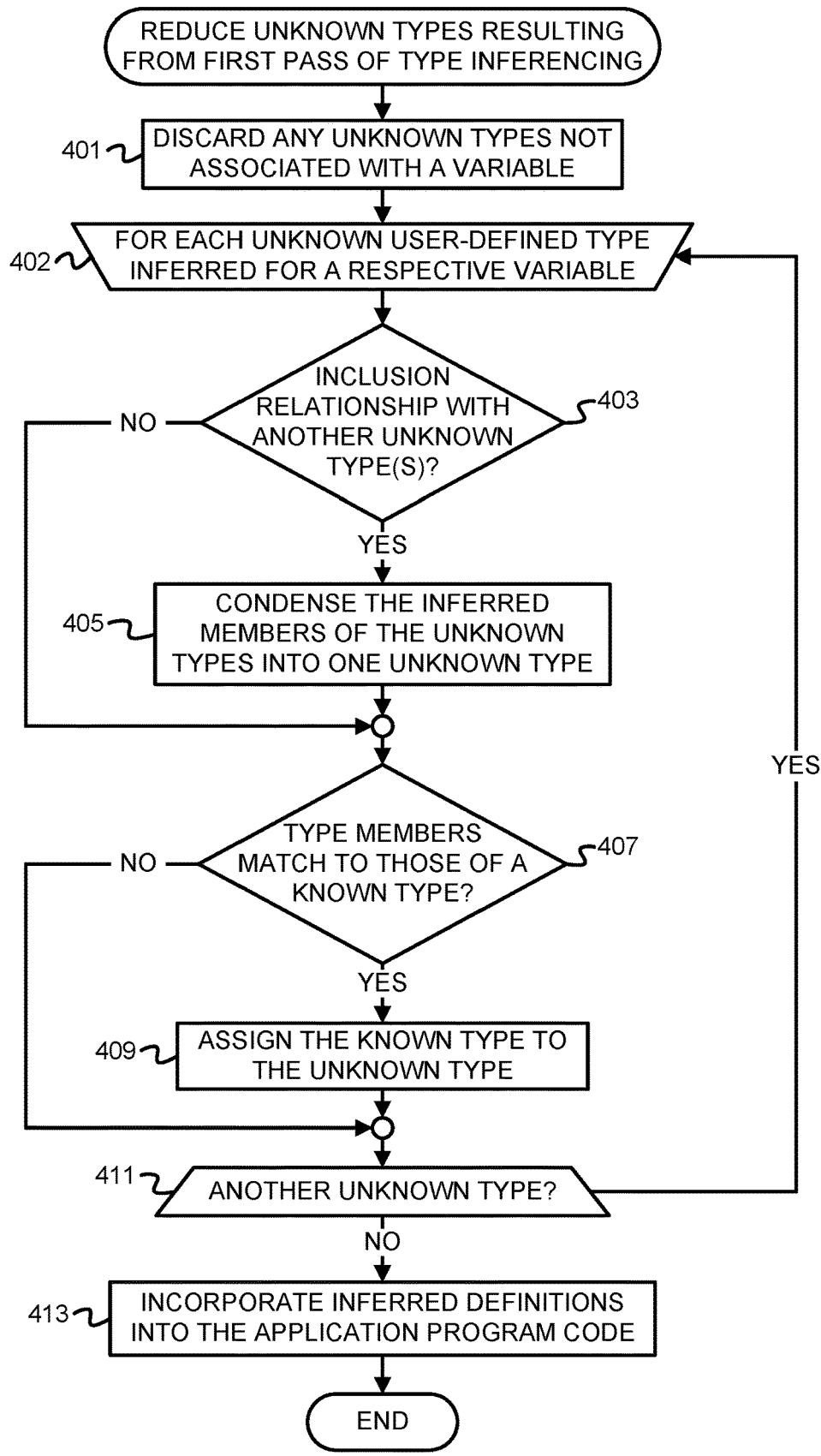
FIG. 4 is a flowchart of example operations for reducing unknown types resulting from a first pass of type inferencing.

FIGS. 3-4 are flowcharts of example operations for building inferred definitions of unknown user-defined types corresponding to variables identified in program code of an application. The example operations are described with reference to a type definition inferencing system and an application augmentation system (hereinafter "the inferencing system" and "the augmentation system," respectively) for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for building inferred definitions of unknown user-defined types. The example operations assume that the inferencing system has been supplied one or more files comprising application program code. The program code may be an intermediate representation of the application source code, such as bytecode. In implementations, a static analyzer that comprises the inferencing system or with which the inferencing system communicates may have imported binary code of the application and decompiled the binary code to yield an intermediate representation or may have imported source code of the application. The example operations also assume that the application program code comprises at least one user-defined type, such as a class, struct, etc. Additionally, FIG. 3 depicts transitions between blocks of example operations with dashed lines. Dashed lines connecting blocks of example operations represent that flow from one block can transition to one of multiple next blocks, and to which block flow proceeds can vary.

At block 301, the inferencing system begins an iteration of traversing control flow of an application. The static analyzer may have generated a control flow graph of the application that the inferencing system can traverse based on the program code of the application, where the control flow graph indicates control flow paths of the application. Type inferencing can be performed as part of data flow analysis that leverages the control flow graph of the application. Each complete traversal along the control flow paths (i.e., from an entry point to exit point(s)) is referred to as an iteration. At each iteration, the inferencing system infers types of variables identified during the traversal. The inferencing system can infer types of non-user-defined or built-in types, such as scalar variables or primitive data types (e.g., integers, Booleans, strings, etc.), in accordance with standard type inferencing.

At block 303, the inferencing system infers a variable has a user-defined type. The inferencing system identifies the variable in an expression or statement of the program code encountered along the control flow traversal. For instance, the expression/statement may correspond to a node in the control flow graph and comprises at least a first variable. The inferencing system may have been preconfigured with rules for inferring types of variables for one or more programming languages, such as based on constraints identified for variables in the program code. Typing rules may comprise rules for constraints on expressions and the terms therein and/or syntactic elements identifiable in the program code that are indicative of a respective type. Typing of non-user-defined types is assumed to be performed based on such rules and/or constraints. The inferencing system can infer that the variable is of a user-defined type based on heuristics that may be implemented with criteria for keywords in program code and/or structure of expressions/statements. An example is a heuristic that variables on the left hand side as a base of an expression/statement comprising a variable access and/or function call can generally be inferred to be user-defined (e.g., $x→foo( ) or $x→var); these expressions/statements often correspond to member variable references and/or method calls. To illustrate, a variable identified on the left hand side of an expression comprising the keyword "new" can be inferred to be user-defined (e.g., a constructor call, such as $x=new ExampleClass( ) in PHP source code). As another example, the variable may already have a user-defined type as its best type (e.g., during a prior iteration), and the expression/statement may be a statement comprising a function called on the variable and/or an expression by which a member variable of the user-defined type is accessed (e.g., $x→foo( )).

At block 305, the inferencing system determines any contextual information associated with the user-defined type. Contextual information can include function calls made by the variable and/or other variables accessed via the variable. Such contextual information may be indicative of the member variables and/or member functions (e.g., methods) associated with the user-defined type; member variables may also be referred to as properties or data members of the user-defined type (e.g., in the context of PHP classes). The contextual information can be determined based on other terms in the expression/statement, such as other variables and/or function calls associated with the variable. Contextual information may also include a name of the type or other reference thereto (e.g., a class name), such as in an expression comprising a constructor call. The type name can be represented in source code or an intermediate representation depending on the type of program code (i.e., source code, binary code, or an intermediate representation) that was supplied for static analysis.

At block 307, the inferencing system determines if the user-defined type inferred for the variable is a known type. The inferencing system can determine that the type is not a known type and is thus an unknown type if a type definition has yet to be identified for the user-defined type; in other words, the program code comprises evidence for the existence of the user-defined type but its definition has yet to be identified. The inferencing system can determine that the type is a known type based on heuristics for inferring whether a type of a variable is known, where the heuristics can be implemented with rules, criteria, etc.

Heuristics for discerning the type of a variable as being a known type can include the identification of constructor calls or other expressions comprising the keyword "new" in which the variable is identified on the left hand side, availability of a function prototype for a function called by the variable, such as in the case of imported libraries/frameworks, etc. Additionally, in some programming languages, types of variables indicated as function parameters may be declared or defined (e.g., as in PHP). Variables designated in function parameters that have a declared/defined type therein can be determined to have a known type that corresponds to that which is declared/defined, where such types are immutable during type inference. Heuristics for determining that a type of a variable is unknown can include identification of a first occurrence of a variable in an expression/statement comprising a function call or variable access/reference by the variable (e.g., such expressions/statements where the variable is on the left hand side) without previously encountering a constructor call or other initialization for the variable. If the user-defined type is an unknown type, operations continue at block 309. If the user-defined type is a known type, operations continue at block 316.

At block 309, the inferencing system determines if the unknown type has already been recorded for the variable. The inferencing system records indications of variables inferred to have unknown types as they are identified and, for each variable, one or more inferred member functions/variables of unknown type. Inferred member functions/variables (include those that have been identified in association with the variable from contextual information determined earlier in the control flow path traversal or during a previous iteration. Indications of unknown types and inferred member variables and/or member functions may be stored in a data structure(s) and/or may be stored in properties created for variables that are carried with the variable through control flow paths and thus can be propagated. To illustrate, the inferencing system may associate a property indicating a name of an unknown type with each variable and maintain a data structure to associate unknown type names with their inferred member variables and/or member functions. This unknown type name is one that is assigned for internal use and is unique across type names in the program code so the unknown type can be distinguished from other, existing type names. If unknown types are recorded as properties associated with variables, the inferencing system determines if a property indicating an unknown type has already been associated with the variable (e.g., as opposed to a property indicating a generic/default type). In implementations where unknown types are stored in a data structure, the inferencing system can search, perform a lookup, index, etc. the recorded indications of unknown types with the variable name to determine if a record for the variable already exists. If the unknown type has not yet been recorded for the variable, operations continue at block 311. Otherwise, operations continue at block 313.

At block 311, the inferencing system records the unknown type of the variable and the contextual information. The inferencing system can record an indication of the unknown type for the variable that indicates the inferred member variables and/or member functions of the unknown type identified from the contextual information. As an example, for the statement "$x→var" that corresponds to a member variable access by $x, where $x has an unknown type, the inferencing system records $var as an inferred member variable of the unknown type of the variable $x. Recording an indication of the unknown type for the variable can include associating a unique name given for the unknown type of the variable as a property value, with the inferred member variables/functions also associated therewith (e.g., as an additional property value(s) or recorded in a data structure that maps indications of unknown types of variables to their inferred member variables and/or member functions). As another example, the inferencing system can create a new element in a data structure comprising recorded unknown types and store the variable and the inferred member variable(s) and/or member function(s) of the unknown type in the data structure element.

At block 313, the inferencing system updates the recorded unknown type of the variable with the contextual information. Before updating an unknown type with contextual information, which may comprise a member variable(s) accessed by the variable and/or function(s) called by the variable that is/are respectively inferred to be a member variable(s) and/or method(s) of the unknown type, the inferencing system may determine whether any of the contextual information has already been recorded for the unknown type. If at least some of the contextual information has not yet been recorded for the unknown type (e.g., at least one inferred member variable or method), the inferencing system updates the unknown type recorded in association with the variable (e.g., in a corresponding data structure element or with an additional property value(s)) with the contextual information. Unknown types can be considered to be merged in this case. In other words, since the variable previously was inferred to have an unknown type, and a subsequent occurrence of the variable suggested that its type is unknown (e.g., based on a subsequent member variable access/function call), the preceding inferred member variable(s)/function(s) of the unknown type is/are merged with the newly inferred member function(s)/variable(s) of the unknown type.

At block 315, the inferencing system continues traversal of the control flow paths with propagation of type information associated with the unknown type. To facilitate maximally building out an unknown type during the first pass of type inferencing, in contrast with conventional type inferencing with data flow analysis, the inferencing system propagates type information determined for unknown types (e.g., types of inferred member variables and types of any associated parameters and/or return values of functions) instead of known types along control flow paths and between iterations during the first pass. For instance, propagation of the type information can include carrying type information inferred for the unknown type down chains of assignment operations and/or through function calls as the variable is identified in assignment operations and/or function calls. Flow from block 315 can proceed to block 303 if another variable to be typed is encountered during the traversal or block 319 if traversal with propagation of the unknown type information for the variable completes without identification of a variable for which type information can be inferred (including additional type information about the variable identified at block 303).

At block 316, the inferencing system records the contextual information in association with known types. The inferencing system maintains indications of type information of known types, including inferred types of member variables, return types, and/or parameters of the known types, separately from the unknown types (e.g., in another data structure). Known types of variables may have been previously determined and recorded during initial processing of the program code before type inferencing by the inferencing system, such as when generating an intermediate representation of binary code supplied for static analysis (where the intermediate representation is the program code processed by the inferencing system); types of their member function return values/parameters and member variables can then be inferred and recorded during type inference by the inferencing system. Types of variables that are known may be marked as immutable such that typing of a variable for which a known type is inferred does not change during the first pass (e.g., as is the case for function parameters with explicitly defined/declared types and/or variables identified in a constructor call for a type).

At block 318, the inferencing system continues traversal of the control flow paths without propagation of type information associated with the known type. Unlike with unknown types, type information associated with known types is not propagated along control flow paths and between iterations—particularly in cases where a variable has an unknown type that is propagated and a known type later may be inferred for the variable, in which the known type information is recorded without propagation and the unknown type remains "preferred" for propagation—and is recorded separately from the variables (e.g., instead of in properties of the variables). Flow from block 318 can proceed to block 303 if another variable is encountered during the traversal or block 319 if traversal completes without identification of a variable for which type information can be inferred (including additional type information about the variable identified at block 303).

At block 319, the inferencing system determines that traversal of the application control flow is complete. Traversal may be determined to be complete if the inferencing system determines that all control nodes in the application code have been visited.

At block 321, the inferencing system determines if a convergence criterion is satisfied. The convergence criterion for the first pass of type inferencing is a criterion that each of the unknown types is maximally built with inferred member functions and/or variables; in other words, there are no changes to the set of unknown types during an iteration. The inferencing system can track at each iteration whether the set of unknown types has been updated either through recording of a new variable with an unknown type or updating an existing unknown type of a variable with a new inferred member function/variable based on contextual information. For instance, the inferencing system may initialize a Boolean with a default value at the start of an iteration that evaluates to 0, false, etc. to indicate that no changes to the unknown types have been made during the iteration and update the value of the Boolean to 1, true, etc. once a change has been made to the set of unknown types. The inferencing system can evaluate the value of the Boolean at the end of the iteration based on the convergence criterion to determine whether the criterion is satisfied. If the convergence criterion is not satisfied, operations continue at block 323. If the convergence criterion is satisfied, operations are complete.

At block 323, the inferencing system continues to a next iteration of program code traversal. The inferencing system begins a new traversal of the control flow of the application. Any information about the unknown types of variables recorded during the now-complete iteration is maintained between iterations so unknown types may be further built from additional contextual information identified during subsequent traversals.

FIG. 4 is a flowchart of example operations for reducing unknown types resulting from a first pass of type inferencing. The example operations assume that one or more variables were inferred to have unknown, user-defined types during a first pass of type inferencing performed as described above. Each of the unknown types corresponding to a variable may comprise one or more inferred member functions and/or variables and their corresponding inferred types (collectively "members," such as class members that include data members/properties and/or methods).

At block 401, the augmentation system discards any unknown types that are not associated with a variable. Unknown types that are not associated with a variable may include, for instance, unknown types that were initially inferred for a respective variable that was later assigned a known type. Another example of an unknown type that may not be associated with a variable is an unknown type that was initially inferred for a variable but was merged with an unknown type propagated to another occurrence of that same variable. An unknown type may be discarded by deleting a respective data structure element that stores the inferred member(s) of the unknown type.

At block 402, the augmentation system begins iterating over unknown types of variables that were inferred from the first pass of type inferencing. The augmentation system can iterate over variables having unknown types (e.g., based on property values associated therewith) and/or elements of a data structure that stores indications of variables for which unknown types were inferred.

At block 403, the augmentation system determines if the unknown type has an inclusion relationship with another unknown type(s). A first unknown type has an inclusion relationship with a second unknown type if its inferred members constitute a subset of inferred members of the second unknown type or if the second unknown type's inferred members constitute a subset of the inferred members of the first unknown type (i.e., if the inferred members of the first unknown type are a subset of the inferred members of the second unknown type or vice versa). The determination of inclusion relationships may also take into consideration inferred types of the inferred members, including inferred types of member variables, return values, and/or parameters across members. The augmentation system compares the inferred members of the unknown type to inferred members of other unknown types to determine if an inclusion relationship exists with one or more other unknown types. If an inclusion relationship exists between unknown types, operations continue at block 405. Otherwise, operations continue at block 407.

At block 405, the augmentation system condenses the inferred members of the unknown types having an inclusion relationship into one unknown type. The augmentation system can update a data structure(s) that stores indications of variables with unknown types and the respective inferred members to reflect the reduction of members into one unknown type. For instance, the augmentation system can remap the key(s) corresponding to the variable(s) (e.g., a key indicating a name of the unknown type assigned for the variable) having the less complete set of members of the unknown type to the value corresponding to the maximal (i.e., most complete) set of members inferred for the unknown type.

At block 407, the augmentation system determines if the type members inferred for the unknown type match to those of a known type. The type members of the unknown type can match to type members of a known type if a known type having a complete type definition comprises the type members of the unknown type such that the inferred definition of the unknown type constitutes a subset of the type definition of the known type. The augmentation system compares the members of the unknown type to the members of known types to determine if the unknown type members constitute at least a subset of members of a known type. If the type members inferred for the unknown type are equivalent to those of a known type, operations continue at block 409. Otherwise, operations continue at block 411.

At block 409, the augmentation system assigns the known type to the unknown type. The augmentation system may determine that the type of the corresponding variable(s) typed with the unknown type is in actuality a known type and can remove the unknown type from the maintained unknown types. Types associated with member variables/functions associated with the known type may also inform the augmentation system of types associated with the inferred members of the unknown type, such as if the known type comprises type declarations that can inform assignment of types to the corresponding inferred members.

At block 411, the augmentation system determines if there is another unknown type that has not been reduced into a more complete unknown type or matched to a known type. The augmentation system may flag or otherwise denote entries of the data structure that have been processed as part of either condensing unknown types as described at block 405 or matching unknown types to known types as described at block 409. If there is such an unknown type remaining, such as if an unflagged entry of the data structure (e.g., an unflagged map key) exists, operations continue at block 402. Otherwise, operations continue at block 413.

At block 413, the augmentation system incorporates inferred definitions of each unknown type into the program code of the application. After unknown types have been reduced as possible through subset inclusion and/or mapping to known types, the remaining set of unknown types indicates, for each unknown type, a maximal set of inferred members of the unknown type. The augmentation system can create an inferred definition of each unknown type that comprises its one or more inferred members and their corresponding inferred types and incorporate the inferred definition into the application program code. Incorporation into the application program code can be achieved by integrating the inferred definition into a model of the application created by the static analyzer in which the augmentation system is incorporated or by writing the inferred definition represented in the corresponding programming language (e.g., in an intermediate representation of the application source code) to a file(s) of the application. Creation of the inferred definition of an unknown type may be based on syntax of the programming language or intermediate representation thereof. The resulting augmented version of the application files can be supplied to the static analyzer for a second pass of type inferencing and data flow analysis.

FIGS. 1-4 describe modeling types of variables having a user-defined type where a type definition may be absent for improved static analysis, including data flow analysis, of incomplete applications. After the second pass of type inferencing, some variable types may still be unknown (e.g., based on inability to match the inferred type definition to a known type), and member functions of those unknown types will thus lack a function body. However, the system 103 can infer types of parameters of member functions of an unknown type and include the parameter types in the respective inferred definition that is incorporated into the application. Typing of parameters for member functions of unknown types—which would otherwise be unknown—can be informative for subsequent static analysis of the application, such as data flow analysis, particularly in the context of security scanning of applications.

FIGS. 1-4 describe type inferencing for local variables with user-defined types. As is now described in reference to FIG. 5 and FIG. 6, different issues may arise from type inferencing when program code comprises global variables. Global scoping of variables is implicit in some dynamically typed languages (e.g., PHP and JavaScript) rather than explicit. Namely, rather that variables being designated as global when they are created or declared (e.g., with the "global" keyword), variables created/declared outside of functions are global variables that will be accessible from the global scope, while those created/declared inside of functions are local variables. Conflicting names of different global variables, including those having different types, may arise due to the implicit nature of creation/declaration of global variables. While global variables having the same name but different types indeed refer to different data, during data flow analysis, one memory location will be allocated that corresponds to the global variable name. The memory location represented by the repeated global variable name can correspond to each of the different types at various times during the analysis, but from the perspective of memory locations, the global variable name will correspond to a single variable irrespective of the different types to which the name corresponds.

Figure 5:
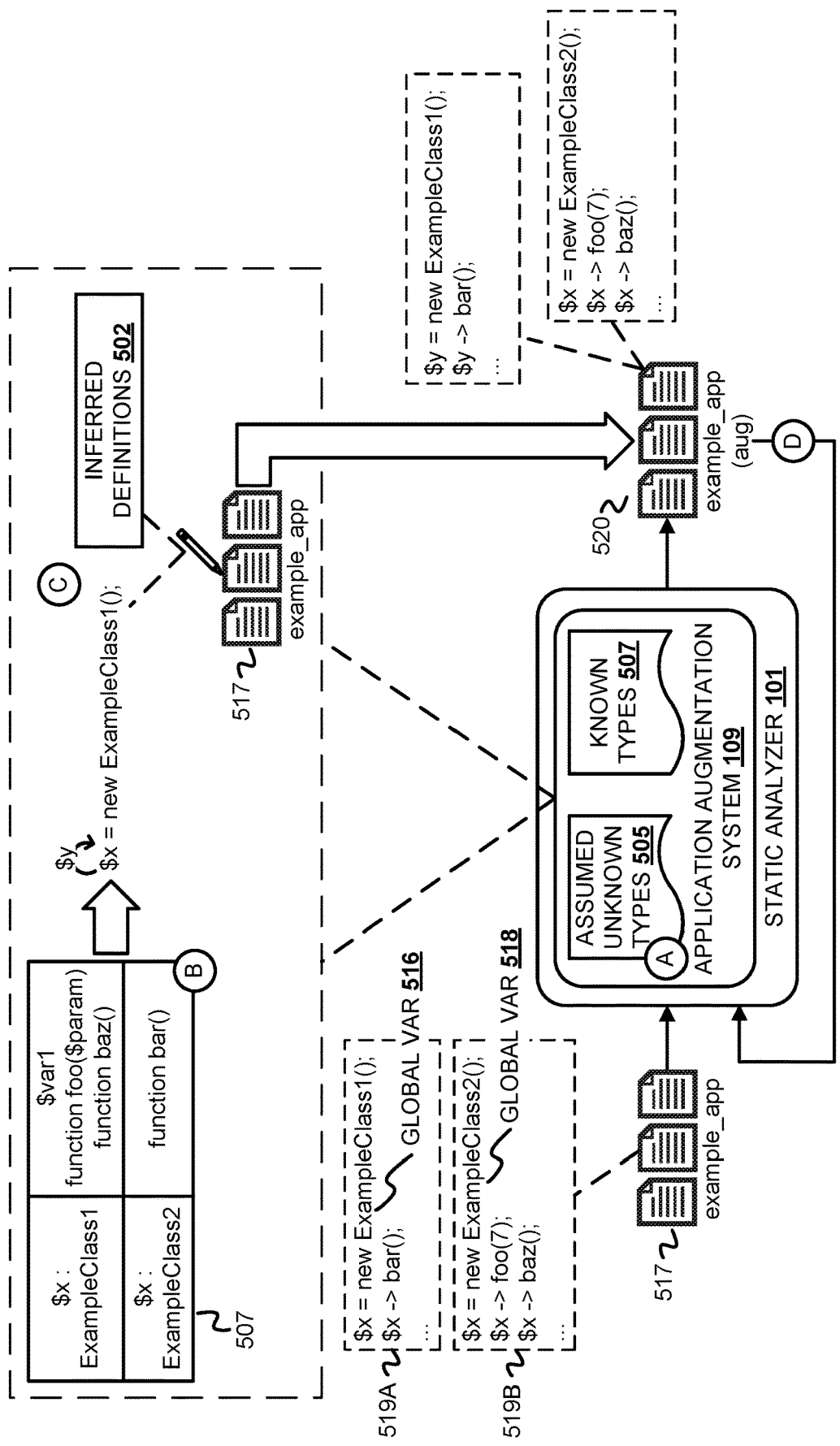
FIG. 5 is a conceptual diagram of renaming global variables between passes of type inferencing for an application.

FIG. 5 is a conceptual diagram of renaming global variables between passes of type inferencing for an application. FIG. 5 depicts an example of program code of an application that are included in different ones of application files 517, which comprises a script 519A and a script 519B. The script 519A of a first of the application files 517 comprises a global variable 516, depicted as a variable $x that stores an instance of an object having a user-defined type named ExampleClass1, which is assumed to be a known class in this example (i.e., the application files 517 comprise a class definition for ExampleClass1). The script 519B of a second of the application files 517 comprises a global variable 518, depicted as a variable $x that stores an instance of an object having a user-defined type named ExampleClass2, which is also assumed to be a known class in this example. As with the application files 117 and program code 119 of FIG. 1, the scripts 519A-B are depicted as PHP scripts comprising exemplary PHP code to aid in illustration. In implementations, however, the application files 517 can comprise an intermediate representation of PHP or another programming language (e.g., bytecode).

This example also assumes that the system 103 has already completed a first pass of type inferencing (as similarly described above in reference to FIG. 1) and identified assumed unknown types ("unknown types") 505 and known types 507 based on traversing control flow paths of the program code 519. The first pass of type inferencing is assumed to have resulted in the identification of two variables named $x having different types that were inferred based on heuristics for identifying known types in program code. In particular, the known types 507 comprise a type ExampleClass1, which corresponds to the global variable 516 named $x and has an inferred member variable $var1 and inferred member functions named baz( ) and foo( ), with foo( ) accepting one parameter depicted as $param. The known types 507 also comprise a type ExampleClass2, which corresponds to the global variable 518 named $x and has an inferred member function named bar( ). The global variables 516, 518 are thus same-named global variables of different types that are globally scoped but are created in different files within the application files 517. While not depicted in FIG. 1 for simplicity, the known types 507 can further comprise inferred types of the member variable $var1, of the parameter $param of the function foo( ), and any return types of the identified functions.

FIG. 5 is annotated with a series of letters A-D. Each letter represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the system 109 determines whether any of the unknown types 505 can be condensed and/or matched to a respective one(s) of the known types 507 based on whether inclusion relationships can be identified among inferred members. While not depicted in further detail in FIG. 5 for clarity, the system 109 determines whether unknown types can be condensed or assigned a known type as similarly described above in reference to FIG. 2.

At stage B, the system 109 determines that the global variables 516, 518 share a same name but have different types and that at least one of the global variables 516, 518 should be renamed. After the first pass of type inferencing and propagation of unknown type information, the system 109 determines whether the known types 507 indicate a global variable name for which evidence of multiple known types was collected during the first pass. From this, the system 109 infers that the multiple known types correspond to what are intended to be disparate global variables with different types and can thus rename one or more of the same-named global variables to effectively separate the global variables into their unique corresponding instances in the program code. Renaming of global variables may be based on type information stored in the known types 507 such that the system 109 evaluates types inferred for each of the variables represented in the known types 507. The system 109 identifies from the known types 507 that a same variable name, $x, was inferred to correspond to instances of two different known types (i.e., instances of ExampleClass1 and ExampleClass2). The system 109 thus determines that at least one of the global variables 516, 518 should be renamed to distinguish the globally scoped occurrences of $x for the purpose of type inferencing and static analysis.

At stage C, the system 109 augments the application files 517 to yield augmented application files 520 based on incorporating renaming of the global variable 516 into the application files 517. Augmenting the application files 517 includes incorporating enhanced typing information for local and/or global variables that was collected during the first pass of type inferencing as described herein. For augmentation related to local variables, system 109 can create the inferred definitions 502 and incorporate the inferred definitions 502 into the application files 517 as described above in reference to FIG. 2. For augmentation related to global variables, in this example, the system 109 also renames the global variable 516 to a new, unique name (i.e., a variable name that is unique in the context of the program code 519). Renaming to a name unique across the application files 517 can be performed for one or for each global variable of those having the same names. In this example, the system 109 renames the global variable 516, to $y. Renaming of global variables may be to a default name with which the system 109 has been configured, where the system 109 may maintain a plurality of potential default variable names in the event that a first default name conflicts with existing variable names identifiable from the program code 519, or may be to a name corresponding to a string randomly generated by the system 109.

The system 109 identifies instances of the global variable 516 that should be renamed based on analyzing lexical scopes of the global variables 516, 518 across the application files 517 to determine if a lexical scope comprises the global variables 516, 518 of the disparate types. The lexical scope associated with each of the global variables 516, 518, accounts for use of the global variables 516, 518 across the application files 517 based on inclusions of their respective scripts 519A-B. For instance, the script 519A comprising the global variable 516 from which the known type of the global variable 516 was inferred may be included in others of the application files with inclusion statements (e.g., "include" in PHP).

The system 109 can logically partition the application files 517 based on the lexical scope analysis resulting in a finding that both global variables 516, 518 are used in a same lexical scope, where each logical partition corresponds to the lexical scope of one of the unique instances of $x to be renamed based on inclusions of the corresponding one of the scripts 519A-B. With respect to the global variable 516, the logical partition comprises the script 519A based on which the known type was heuristically inferred for the global variable 516 and any includers and/or includes of the script 519A (i.e., scripts that include and/or are included in the script 519A). The system 109 can introduce the renaming of the global variable 516 into its respective logical partition by renaming the instances of $x therein to $y. In implementations, occurrences of each uniquely typed but same-named global variable can be renamed similarly (e.g., for renaming of both of the global variables 516, 518).

At stage D, the system 109 designates the augmented application files 520 for a second pass of type inferencing by the static analyzer 101. The augmented application files 520 have incorporated the inferred definitions 502 and renaming of the global variable 516. The static analyzer 101 can perform a second pass of type inferencing on the augmented application files 520 according to a standard type inferencing algorithm (e.g., a constraint-based, fixed-point algorithm) as similarly described above in reference to FIG. 2. In addition to improved typing of any variables that were inferred to have unknown types during the first pass by way of augmenting the application files 517 with the inferred definitions 502, types of the global variables 516, 518 can be correctly modeled as distinct due to the renaming of the global variable 516.

FIG. 5 assumes that the known types of the global variables 516, 518 were inferred based on control flow path traversal by the system 103 as described herein e. In implementations, renaming of global variables may be performed after a first pass of a standard type inferencing algorithm, such as a constraint-based type inferencing algorithm. With conventional type inferencing techniques, a variable with evidence of multiple types is assigned one type to aid in convergence of the algorithm. The type assigned to such a variable with evidence of multiple types may be a generic type that is treated as immutable. With reference to FIG. 5, with standard type inferencing, the global variables 516, 518 would be treated as the same variable having evidence of multiple types and therefore assigned a same type (e.g., the generic type) due to having the same name despite these variables being distinct and corresponding to different types and memory locations. In this case, the system 109 may treat existence of generic types as evidence for same-named but differently-typed global variables and renames at least one of the global variables accordingly. Performing a second pass of type inferencing with the renaming to distinguish the global variables 516, 518 incorporated is thus advantageous since the respective types of the global variables 516, 518 can be modeled correctly rather than erroneously being assigned a single (e.g., generic) type that encompasses both differently-typed variables.

Figure 6:
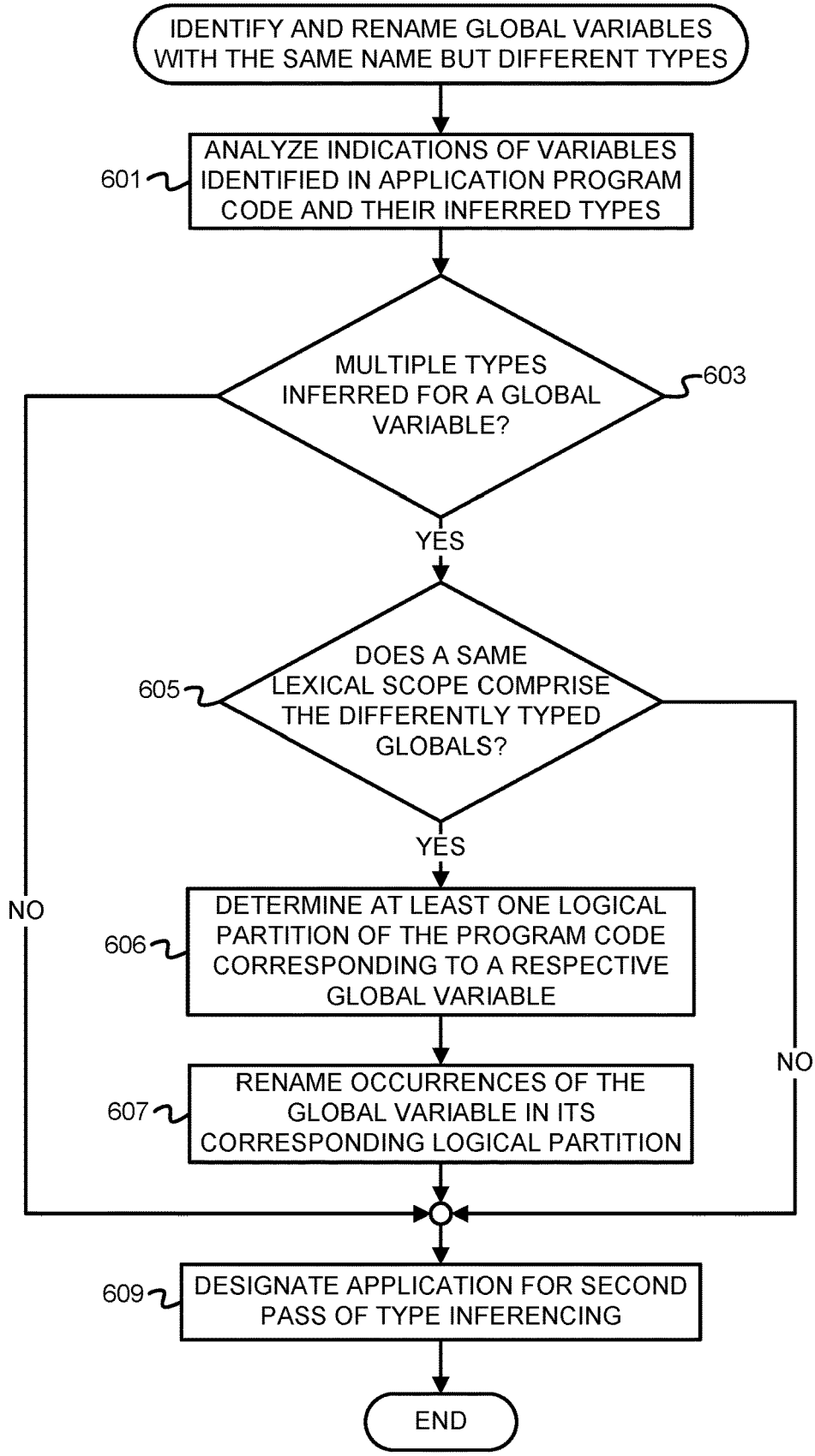
FIG. 6 is a flowchart of example operations identifying and renaming global variables with the same name but different types.

FIG. 6 is a flowchart of example operations identifying and renaming global variables with the same name but different types. The example operations are described with reference to an application augmentation system for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

The example operations of FIG. 6 assume that the augmentation system has access to inferred types of variables in application program code based on a first pass of type inferencing. The first pass of type inferencing may have been performed as described above such that inferred types of variables can comprise unknown user-defined types for which a definition was built or may have been performed according to a standard type inferencing algorithm. In the case of the latter, variables having unknown types or variables with evidence of multiple types (whether known or unknown) may be assigned a default/generic type as a best type.

At block 601, the augmentation system analyzes names of variables identified in application program code. The variable names at least comprise names of variables inferred to have user-defined types, some of which may be globally scoped, such as global variables of PHP applications. Each of the variables also has at least one inferred type associated therewith. Analysis of the variable names at least includes comparison of names across variables to determine if global variables, if any, share a name.

At block 603, the augmentation system determines if multiple different types were inferred for a global variable. These may correspond to global variables that share a name but have different types and are thus disparate. Such global variables that share a name can be identified if distinct variable value assignments or declarations comprising the same variable name were identified in the application program code (e.g., in corresponding nodes of a control flow graph or abstract syntax tree) and subsequently had different respective types inferred based on heuristics for inferring known types. For instance, an identified globally scoped variable may have been introduced (i.e., declared or created) with a name that is also used by another globally scoped variable, such as if the two global variables are introduced in different respective files of the application, but with different type names identified from the heuristics for known typing (e.g., different class or struct names).

Whether multiple types were inferred for the global variable name may be based on names of the known types associated with the global variable name and/or whether the sets of member functions/variables of the respective inferred types built in association with the global variable name differ. If the first pass of type inferencing was performed with standard type inferencing, global variables with a same name but different types may have been presumed to be a single variable (i.e., assumed to correspond to the same location in memory) for which evidence of multiple types was identified and thus were both typed with a generic type as a best type. The presence of such a generic type that refers to a global variable may also be treated as an indicator that the corresponding variable actually encompasses same-named globals that correspond to different memory locations and have different types. If the augmentation system identifies multiple inferred types for a global variable which thus may correspond to two or more disparate global variables that share the same name, operations continue at block 605. Otherwise, if no global variables had multiple types inferred or there were no global variables declared, operations continue at block 609.

At block 605, the augmentation system determines if a same lexical scope of the program code comprises the differently typed global variables. The augmentation system analyzes lexical scoping of the program code to determine occurrences of the variable name and the corresponding inferred types. Analysis of lexical scoping can comprise analyzing inclusions of the script(s)/file(s) corresponding to the global variables across application files (e.g., based on one or more identified "include" statements and sequences thereof, such as inclusions of a PHP script comprising the global variable across files). The lexical scope determined in this manner encompasses use of the global variable(s) across files. If a same lexical scope comprises evidence of use of the disparate types of the same-named global variable, operations continue at block 606. Otherwise, operations continue at block 609.

At block 606, the augmentation system determines at least a first logical partition of the program code corresponding to a respective one of the global variables. Similar to the lexical scope analysis described above, for each global variable to be renamed, the augmentation system can determine the logical partitioning corresponding to the global variable based on determining, from the script/file in which the global variable was inferred to have a known type (e.g., an expression in which the global variable was created), other scripts/files that include that script/file or other scripts/files included in that script/file. The augmentation system can determine this based on analysis of inclusion statements and sequences thereof (e.g., include or require statements, such as PHP "include" statements) identifiable from the program code. For N differently typed global variables sharing a name, the augmentation system determines a logical partition for at least N−1 of the global variables to provide for distinguishing between occurrences of the global variables in the program code. As an example, if two same-named but differently typed global variables were identified, the augmentation system determines a logical partition for at least one of the global variables.

At block 607, the augmentation system renames occurrences of the global variable in its corresponding logical partition. Renaming of a global variable may include replacing occurrences of the variable name in the corresponding logical partition of the program code determined at block 606 with the new variable name (e.g., by writing over any identified occurrences of the existing variable name). The replacement variable name may be a default name of one or more default names with which the augmentation system has been configured, where multiple default names may be maintained in case a first default name is not a unique variable name in the context of the lexical scope of the global variable. As another example, the replacement variable name may be a randomly generated string generated by the augmentation system.

At block 609, the augmentation system designates the application for a second pass of type inferencing. The augmentation system can designate files of the application comprising the application program code as input for another pass of type inferencing. The second pass of type inferencing is performed using the augmented/modified representation of the application that was generated as a result of renaming the global variable(s). If global variable renaming is performed in conjunction with inferring definitions of unknown types as described above, the application designated for the second pass of type inferencing may also have any inferred type definitions of respective unknown types incorporated therein as described above. The augmented/modified version of the application thus may also include the inferred type definitions generated as described above in reference to FIGS. 1-4. A static analyzer (e.g., that comprises the augmentation system) can perform the second pass of type inferencing according to a standard type inferencing algorithm, such as a constraint-based, fixed-point solution.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
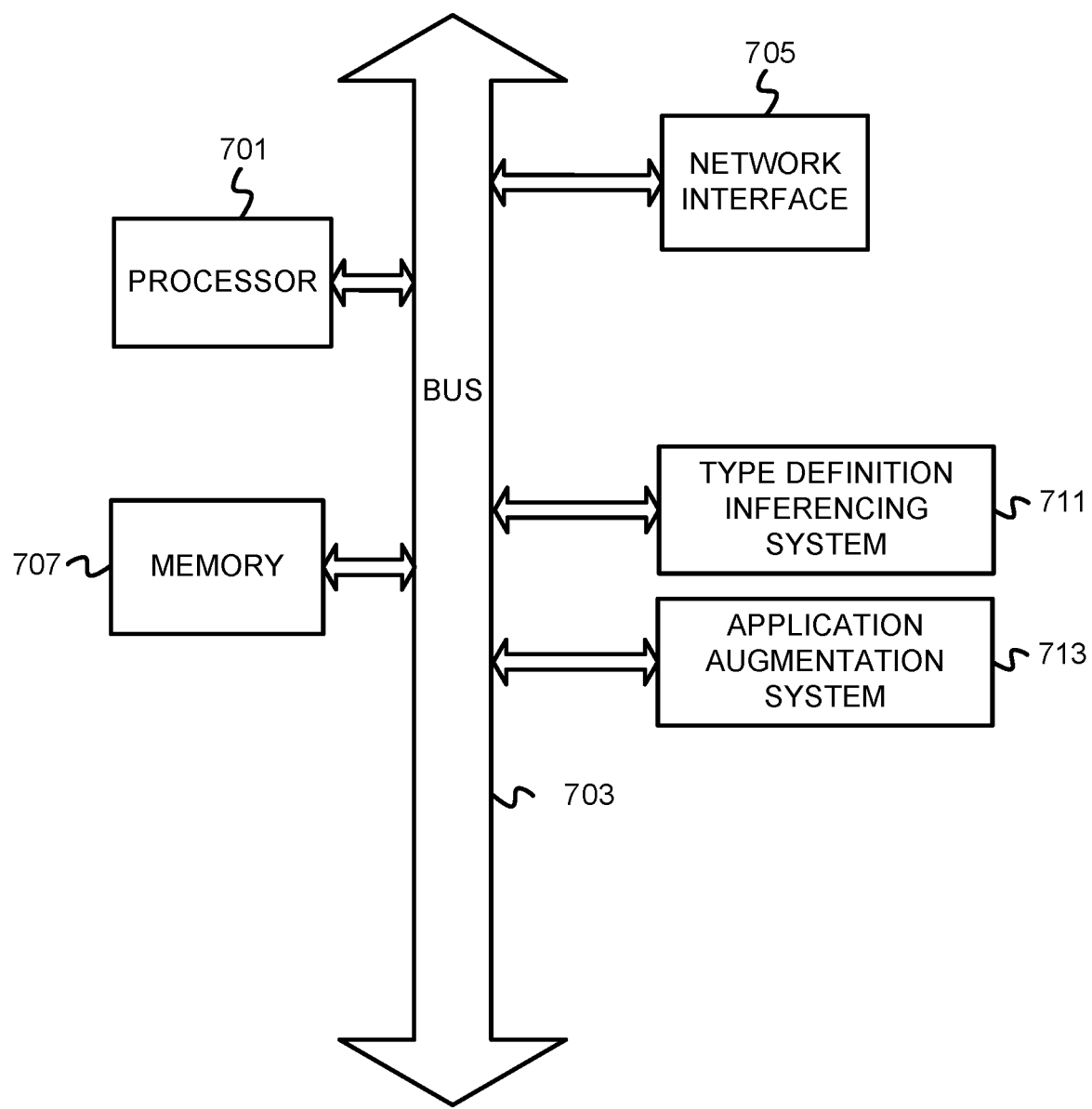
FIG. 7 depicts an example computer system with a type definition inferencing system and an application augmentation system.

FIG. 7 depicts an example computer system with a type definition inferencing system and an application augmentation system. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes type definition inferencing system 711 and application augmentation system 713. The type definition inferencing system 711 builds inferred definitions of user-defined types identified in program code of an application from which a definition is absent (referred to above as "unknown types"). The application augmentation system 713 augments application program code by incorporating therein the inferred definitions of unknown types that were built by the type definition inferencing system 711. The application augmentation system 713 also can rename global variables identified as having the same name but different types to provide for correct type modeling of the global variables. While depicted as part of the same example computer system in FIG. 7, in implementations, the type definition inferencing system 711 and application augmentation system 713 may execute as part of different computer systems. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

The invention claimed is:

1. A method comprising:
   statically analyzing program code of an application over a plurality of iterations, wherein the program code is included in one or more files of the application, and wherein statically analyzing the program code over the plurality of iterations comprises traversing a control flow graph of the application in each of the plurality of iterations to,
   determine that an expression or statement identified in the program code of the application comprises a variable that has a user-defined type;
   determine if a definition of the user-defined type is known based on the program code of the application; and
   based on determining that the definition of the user-defined type is unknown, build an inferred definition of the user-defined type; and
   incorporating the built inferred definition of the user-defined type into the one or more files of the application based on determining that the inferred definition satisfies a criterion.

2. The method of claim 1, wherein traversing the control flow graph to build the inferred definition of the user-defined type comprises,
   determining, based on the expression or statement, at least one of an indication of a first function called for the variable and an indication of a first member variable accessed via the variable; and
   associating the at least one of the indication of the first function and the indication of the first member variable with an indication of the variable.

3. The method of claim 2, wherein the user-defined type is a class or struct, and wherein the first function is inferred to be a member function or method of the user-defined type and the first member variable is inferred to be a data member of the user-defined type.

4. The method of claim 2 further comprising:
determining that a subsequent expression or statement identified in the program code of the application comprises the variable; and
determining, based on the subsequent expression or statement, at least one of an indication of a second function called for the variable and an indication of a second member variable accessed via the variable,
wherein traversing the control flow graph to build the inferred definition of the user-defined type further comprises associating the at least one of the indication of the second function and the indication of the second member variable with the indication of the variable.

5. The method of claim 1, wherein statically analyzing the program code of the application comprises, at each of the plurality of iterations, traversing control flow paths of the application indicated in the control flow graph determined based on the program code.

6. The method of claim 5 further comprising propagating type information included in the inferred definition of the user-defined type along the control flow paths of the application during traversal of the control flow graph, wherein the type information comprises at least one of a parameter type, a return value type, and a member variable type.

7. The method of claim 5 further comprising, based on determining that the definition of the user-defined type is unknown and subsequently determining that type information associated with the user-defined type corresponds to a type with a known definition, recording the type information for the user-defined type without propagating the type information along control flow paths of the application.

8. The method of claim 5 further comprising terminating analysis of the program code based on determining that the inferred definition satisfies the criterion, wherein determining that the inferred definition satisfies the criterion comprises determining that the inferred definition did not change during a last one of the plurality of iterations.

9. The method of claim 1, wherein the one or more files of the application comprise an intermediate representation of source code of the application, and wherein statically analyzing the program code comprises statically analyzing the intermediate representation of the source code.

10. The method of claim 9, wherein the source code is PHP code and the intermediate representation of the source code is bytecode.

11. The method of claim 1 further comprising, based on incorporating the inferred definition of the user-defined type into the one or more files of the application, performing data flow analysis of the application.

12. One or more non-transitory machine-readable media having program code stored thereon, the program code comprising instructions to:
statically analyze an application over a plurality of iterations, wherein the instructions to statically analyze the application comprise instructions to traverse a control flow graph of the application in each of the plurality of iterations to,
determine that a type of a first variable identified from program code of the application is a user-defined type;
determine whether a definition of the user-defined type is known based on the program code of the application; and
based on a determination that the definition of the user-defined type is unknown, infer a type definition of the user-defined type to create an inferred definition; and write the inferred definition into the program code of the application based on a determination that the inferred definition is maximally built.

13. The non-transitory machine-readable media of claim 12, wherein the instructions to infer the type definition of the user-defined type comprise instructions to infer, over the plurality of iterations over the program code, one or more members associated with the user-defined type based on use of first variable in the program code and add the one or more members to the inferred definition of the user-defined type, wherein the one or more members comprise at least one of a member function and a member variable, and wherein the user-defined type comprises a class or struct.

14. The non-transitory machine-readable media of claim 12, wherein the instructions to determine that the inferred definition is maximally built comprise instructions to determine that the inferred definition did not change during a last one of the plurality of iterations.

15. The non-transitory machine-readable media of claim 12, wherein the instructions to statically analyze the application further comprise instructions to,
identify the first variable in an expression or statement encountered along the traversal of the control flow graph, wherein the control flow graph of the application was determined based on the program code of the application.

16. An apparatus comprising:
a processor; and
a machine-readable medium having instructions stored thereon that are executable by the processor to cause the apparatus to,
statically analyze program code of an application over a plurality of iterations, wherein the instructions executable by the processor to cause the apparatus to statically analyze the program code of the application over the plurality of iterations comprise instructions executable by the processor to cause the apparatus to traverse a control flow graph of the application in each of the plurality of iterations to,
based on identification of a first variable at a first of the plurality of iterations, determine that a type of the first variable is user-defined, wherein the program code is included in one or more files of the application;
determine that a definition of the type of the first variable is not known based on the program code of the application; and
build an inferred definition of the type over the first and subsequent ones of the plurality of iterations based on identification of at least one of one or more functions and one or more variables associated with the first variable in the program code; and
incorporate the inferred definition of the type into the program code of the application after a last of the plurality of iterations.

17. The apparatus of claim 16 further comprising instructions executable by the processor to cause the apparatus to:
traverse control flow paths of the application indicated in the control flow graph over each of the plurality of iterations; and
propagate type information included in the inferred definition along control flow paths of the application during each traversal.

18. The apparatus of claim 16, wherein the instructions executable by the processor to cause the apparatus to incorporate the inferred definition of the type into the program code of the application comprise instructions executable by the processor to cause the apparatus to incorporate the inferred definition based on a determination that the inferred definition did not change during the last of the plurality of iterations.

19. The apparatus of claim 16, wherein the instructions executable by the processor to cause the apparatus to identify the first variable during analysis of the program code comprise instructions to identify the variable in an expression or statement of the program code, and wherein the instructions executable by the processor to cause the apparatus to determine that the definition of the type of the first variable is not known comprise instructions to determine that the expression or statement does not comprise a constructor call that indicates the type of the first variable.

20. The apparatus of claim 19, wherein the instructions executable by the processor to cause the apparatus to identify the at least one of the one or more functions and the one or more variables associated with the first variable comprise instructions to identify at least one of a first function and a second variable from the expression or statement and add the at least one of the first function and the second variable to the inferred definition of the first variable.

\* \* \* \* \*